United States Patent

Breton et al.

Patent Number: 6,106,599
Date of Patent: Aug. 22, 2000

[54] INKS

[75] Inventors: Marcel P. Breton; Shadi L. Malhotra; Raymond W. Wong, all of Mississauga, Canada

[73] Assignee: Xerox Corporation, Stamford, Conn.

[21] Appl. No.: 09/342,392

[22] Filed: Jun. 29, 1999

[51] Int. Cl.[7] .................................................. C09D 11/00
[52] U.S. Cl. .................................... 106/31.29; 106/31.61; 106/31.43; 106/31.75
[58] Field of Search ............................. 106/31.29, 31.61, 106/31.43, 31.75

[56] References Cited

U.S. PATENT DOCUMENTS

| | | | |
|---|---|---|---|
| 4,751,528 | 6/1988 | Spehrley, Jr. et al. | 346/140 R |
| 4,791,439 | 12/1988 | Guiles | 346/140 R |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,538,550 | 7/1996 | Yaegashi et al. | 106/31.29 |
| 5,667,568 | 9/1997 | Sacripante et al. | 106/20 R |
| 5,698,017 | 12/1997 | Sacripante et al. | 106/31.49 |
| 5,698,128 | 12/1997 | Sakai et al. | 219/745 |
| 5,700,316 | 12/1997 | Pontes et al. | 106/31.58 |
| 5,897,940 | 4/1999 | Malhotra | 428/212 |

*Primary Examiner*—Mark L. Bell
*Assistant Examiner*—Veronica F. Faison
*Attorney, Agent, or Firm*—E. O. Palazzo

[57] ABSTRACT

An ink composition comprised of (1) an azole compound, (2) a viscosity compound, (3) a lightfastness component, (4) an antioxidant, and (5) a colorant.

38 Claims, No Drawings

INKS

COPENDING PATENT APPLICATIONS AND PATENTS

Inks are illustrated in copending patent applications and patents U.S. Pat. No. 5,931,995, U.S. Pat. No. 5,902,390, U.S. Pat. No. 5,876,492, U.S. Pat. No. 5,922,117, U.S. Pat. No. 5,958,119, U.S. Ser. No. 09/300,210, U.S. Ser. No. 09/300,193, U.S. Ser. No. 09/300,373, U.S. Ser. No. 09/300, 298, U.S. Ser. No. 09/300,331, U.S. Ser. No. 09/300,333, U.S. Ser. No. 09/300,332, and U.S. Ser. No. 09/342,947, the disclosures of each being totally incorporated herein by reference.

The appropriate components of the above recited copending applications may be selected for the inks of the present invention in embodiments thereof.

BACKGROUND OF THE INVENTION

The present invention is directed to inks, especially conductive inks, that is, for example, inks that possess the quality of permitting the transmission of electrical signals generated by electric field assisted acoustic ink jet printing processes and apparatuses with controlled jettability leading to low edge raggedness such as equal to or less than about three microns. The conductivity of a material is usually measured in terms of the reciprocal of resistivity, which is the capacity for electrical resistance. The conductivity values of the invention inks can be expressed as log (pico.mho/cm) and were measured under melt conditions of 150° C. by placing an aluminum electrode in the molten ink and reading the resistivity output on a GenRad 1689 precision RLC Digibridge at a frequency of 1 K.Hz. More specifically, the present invention relates to inks with a melting point of between (throughout between about is similar to from about and includes all values and numbers in between those recited) about 60° C. and about 150° C., and preferably between about 70° C. to about 90° C., and which inks are especially useful for electric field assisted acoustic ink jet printing with enhanced jettability, and acoustic ink processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in some of the aforementioned copending applications, such as an acoustic ink printer for printing images on a record medium. The inks of the present invention in embodiments thereof can be considered a phase-change ink, that is for example an ink that changes from a liquid state to solid state in a suitable period of time, for example from about 1 to about 100 milliseconds and preferably in less than about 10, such as from about 2 to about 7 milliseconds, and which ink contains (1) a phase-change color spreading azole compound with, for example, 2 to 4 nitrogen atoms in the cyclic ring and selected for example, from the group consisting of pyrazole, imidazole, triazole, and tetrazole compounds, and which compounds can fill or substantially fill or be contained in the pores of a substrate such as paper, and which compound has a melting point of about equal to, or lower than about 135° C. and preferably between about 55° C. to about 100° C., and with a low acoustic loss value of equal to, or below about 100 dB/mm, (2) a viscosity modifying compound that can, for example, reduce the viscosity of the ink from, for example, about 12 to about 6 centipoise and which compound is selected from derivatives of pyrrole, indole, imidazoline and thiazole compounds with, for example, a boiling point of equal to, or higher than about 150° C. (Centigrade), and more specifically, possessing a boiling point of from about 150° C. to about 225° C., and a melting point of between about 25° C. to about 130° C. and preferably between about 55° C. to about 100° C., and with a low acoustic loss, which enables a reduction, or minimization of energy consumption, and which acoustic loss is below, or about equal to 60 dB/mm, (3) a lightfastness component, such as a UV absorber, (4) a lightfastness antioxidant, (5) and a colorant, such as a dye, a pigment or mixtures thereof.

More specifically, the present invention is directed to nonaqueous, that is inks that contain no water, or substantially no water, phase-change acoustic ink compositions comprised of (1) a phase-change azole compound, such as a pyrazole, an imidazole, a triazole, a tetrazole, and the like, each with a melting point of, for example, between about 60° C. to about 135° C. and preferably from about 60° C. to about 100° C., and each with a low acoustic loss value of, for example, between about 25 to 80 dB/mm, (2) a viscosity modifying compound that can reduce, or change the viscosity of the ink and which compound is, for example, selected from derivatives of pyrrole, indole, imidazoline and thiazole compounds each with, for example, a boiling point of from about 150° C. to about 225° C., and a melting point of between about 25° C. to about 130° C. and preferably between about 60 to about 100° C., and with an acoustic loss of between about 15 to about 60 dB/mm, (3) a lightfastness UV absorber, (4) a lightfastness antioxidant, (5) and a colorant, and wherein there can be generated with such inks excellent developed images on plain and coated papers with acceptable image permanence, excellent projection efficiency on transparencies without, for example, a post fusing step, and excellent crease resistance, and wherein the inks possess acceptable, and in embodiments superior lightfastness of, for example, between about 90 to about 100 percent and superior waterfastness between, for example, about 95 to about 100 percent. Moreover, in embodiments of the present invention there is enabled the elimination, or minimization of undesirable paper curl since water need not be present, and it is preferred that there be an absence of water. When water is not present in the inks, a dryer can be avoided thereby minimizing the cost of the acoustic ink jet apparatus and processes.

PRIOR ART

In acoustic ink printing, the printhead produces approximately 2.2 picoliter droplets by an acoustic energy process. The ink under these conditions should display a melt viscosity of about 5 to 6 centipoise or less at the jetting temperature. Furthermore, once the ink is jetted onto the paper, the ink image should possess excellent crease properties, and should be non-smearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can usually olerate a temperature up to about 180° C., and preferably up to a temperature of from about 140° C. to about 160° C., the vehicle for the ink should preferably display liquid like properties such as a viscosity of about 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. An ink dye vehicle with a melting point above room temperature is selected so that the ink, which is melted in the apparatus, will not be subject to evaporation or spillage during periods of nonprinting. In thermal ink jet printing processes employing phase-change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets; however, a phase-change ink contains no solvent. Thus, rather than being liquid at room temperature, a phase-change ink is typically a solid or phase-change having a wax-like consistency. These inks usually need to be heated, for example, to approximately 100° C. before the ink melts and turns into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers, which are more expensive than plain paper.

One advantage of a phase-change ink is its ability to print on plain paper since the ink quickly solidifies as it cools and, since it is waxy in nature, does not normally soak into a paper medium. However, phase-change ink jet systems can be cumbersome in structure and in design, that is, the associated integrated electronics of a thermal ink jet head are considerably more compact than those of a phase-change ink jet head.

In addition, U.S. Pat. No. 4,751,528, the disclosure of which is totally incorporated herein by reference, discloses a phase-change ink jet system which includes a temperature controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses ink jet ink, which is phase-change at room temperature. The inks comprise vehicles, such as acids, aldehydes and mixtures thereof, which are phase-change at temperatures between 20° C. and 45° C. The ink is impulse jetted at an elevated temperature in the range of about 45° C. to about 110° C., at which temperature the ink has a viscosity of about 10 to 15 centipoise.

U.S. Pat. No. 4,853,036 and U.S. Pat. No. 5,124,718 discloses an ink for ink jet recording which comprises a liquid composition essentially comprising a coloring matter, a volatile solvent with a vapor pressure of 1 millimeter Hg or more at 25° C., and a solid compound at room temperature and with a molecular weight of 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly(alkylene oxide)-alkylate, a poly(alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

The inks of U.S. Pat. No. 5,667,568 containing, for example, on blends of N'-dodecylbis-stearamide, 95 percent by weight and a colorant of, for example, Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF), 5 percent by weight, and inks of the prior art U.S. Pat. No. 5,698,128 derived from blends of the reaction product of an anhydride and an organoamine, 95 percent by weight and a colorant of Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF), 5 percent by weight generally possess viscosities in the range of about 10 to about 15 centipoise and conductivity values in the range of about 3.5 to about 4.5 log (picomho/cm) compared to preferred viscosities of from about 5 to 6 centipoise and a preferred conductivity value of about 6.5 [log pico.mho/cm] for the inks of the present invention. The advantage of the invention low viscosity and high conductivity inks resides in reduced power consumption by about 35 percent thereby permitting increased printing speed of from about 25 pages per minute to about 40 pages per minute, improved jettability, that is for example, the drop size of the ink is uniform all across the printhead leading to improved ink directionality, that is the velocity of the ink drops has a standard deviation value of between about 3 to about 5 microns and consequently lower edge raggedness of the prints, such as a value of about 5 microns, and preferably equal to or lower than about 3 microns. The edge raggedness is the deviation of the average width of a line measured from the middle of the line to the edge of the line, also known as mid-frequency line-edge noise (MFLN), and can be measured with an optical microscope.

SUMMARY OF THE INVENTION

While the known ink compositions and processes may be suitable for their intended purposes, a need remains for conductive acoustic phase-change ink compositions suitable for thermal ink jet printing. In addition, there is a need for phase-change ink compositions, which are compatible with a wide variety of substrates, such as plain papers, and which inks can generate photographic quality images on coated papers. Further, there is a need for phase-change ink compositions which generate high quality, lightfast, and waterfast images on plain papers. There is also a need for phase-change ink jet ink compositions which provide high quality, fast-drying images on a wide variety of plain papers at a low cost with high quality text and high quality graphics, and wherein the dye of the ink is retained on the paper surface while the ink vehicle can continue to spread within the paper structure. Further, there is a need for phase-change ink jet ink compositions, which exhibit minimal feathering. Additionally, there is a need for phase-change ink jet ink compositions, which exhibit minimal intercolor bleed. There is also a need for phase-change ink jet ink compositions, which exhibit excellent image permanence. Further, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low dye concentrations, and a need for inks with acceptable jettability, conductivity, transfusabilities, and image permanence. A need also remains for ink compositions suitable for ink jet printing wherein curling of the substrate, such as paper, subsequent to printing is minimized, or avoided. Moreover, there is a need for inks wherein the sperulite ink crystal size during solidification can be reduced from a conventional about 6 to about 9 micrometers to about 2 to about 4 micrometers, and preferably 1 to about 2.5 micrometers by, for example, crystallinity inhibitors derived from pyrroles, indoles and imidazolines, and to thereby improve projection efficiency and crease resistance. These and other needs can be achievable with the inks of the present invention in embodiments thereof.

DETAILED DESCRIPTION OF THE INVENTION

Aspects of the present invention relate to an ink composition comprised of (1) an azole compound (2) a viscosity compound, for example, that can control or change the viscosity of the ink, (3) a lightfastness component, (4) an antioxidant, and (5) a colorant; an ink which ink conductive and wherein the azole contains from 2 to 4 nitrogen atoms in the ring; an ink wherein the azole is a solid and is conductive; an ink which contains substantially no water; an ink which contains no water or is water free.; an ink wherein (1) the azole compound has a melting point of from about 60 to about 135° C., and possesses an acoustic-loss value of from about 25 to about 80 dB/mm, and (2) the viscosity compound possesses an acoustic-loss value of from about 15 to about 60 dB/mm; an ink which yields images with crease values of from about 3 to about 8, haze values of from about 10 to about 15, gloss values of from about 80 to about 90, and which ink possesses a conductivity of from about 6 to about 8 [log(pico.mho/cm), and which ink optionally possesses an acoustic-loss value of from about 10 to about 80 dB/mm, and which ink optionally possesses a viscosity of from about 1 centipoise to about 10 centipoise at a temperature of from about 125° C. to about 165° C.; an ink wherein the ink possesses a conductivity of from about 6 to about 8.0 [log(pico.mho/cm); an ink composition wherein the azole compound is present in an amount of from about 1 to about 98 percent by weight, the viscosity compound is present in an amount of from about 59 to about 1 percent by weight, the lightfastness component is present in an amount of from about 10 to about 0.25 percent by weight, the antioxidant is present in an amount of from about 10 to about 0.25 percent by weight, the colorant is present in an amount of from about 20 to about 0.5 percent by weight, and wherein the total of the ink compounds/components is about 100 percent; an ink composition wherein the azole compound is selected from the group consisting of (1) pyrazole, (2) 1-nitropyrazole, (3) iodo pyrazole (4) 4-bromo pyrazole, (5) 4-bromo-3-methylpyrazole, (6) 4-bromo-3,5-dimethyl pyrazole, (7) 3-amino-5-phenyl pyrazole, (8) ethyl 4-pyrazolecarboxylate, (9)1,1'-cyclopentylidenebis-1-H-pyrazole, (9) α-[(2-ethoxy-2-oxoethoxy) imino]-3-pyrazoleacetic acid, (10) ethyl 5-amino-1-phenyl-4-pyrazole carboxylate, (11) 1,1 '-(1-ethylpropylidene)bis-1-H-pyrazole, (12) 3,5-dimethylpyrazole, (13) ethyl 3-amino-4-pyrazole carboxylate, and (14) 3,5-bis(trifluoromethyl) pyrazole; an ink composition wherein the azole compound is selected from the group consisting of pyrazole, iodo pyrazole, and 1,1'-(1-ethylpropylidene)bis-1-H-pyrazole; an ink composition wherein the azole compound is selected from the group consisting of (1) imidazole, (2) 4-methyl imidazole, (3) 2-ethyl imidazole, (4) 2-ethyl-4-methylimidazole, (5) 2-propyl imidazole, (6) 2-isopropyl imidazole, (7) 1-acetylimidazole, (8) 1-benzylimidazole, (9) 2-undecyl imidazole, (10) 1,5-dicyclohexyl imidazole, (11) 1-(2,4,6-triisopropyl benzene sulfonyl imidazole, (12) 1-(mesitylene sulfonyl) imidazole, (13) 1-trans-cinnamoyl imidazole, (14) 2-methyl-4-nitro-1-imidazole propionitrile, (15) 1,1'-carbonyl diimidazole, (16) 1,1'-thiocarbonyl diimidazole, (17) 1,1'-sulfonyl diimidazole, (18) 1,1'-oxalyidiimidazole, and (19) 5-methyl benzimidazole; an ink composition wherein the azole compound is selected from the group consisting of 2-undecyl imidazole, 1,1'-carbonyl diimidazole, 1,1'-sulfonyl diimidazole, and 1,1'-thiocarbonyl diimidazole; an ink composition wherein the azole compound contains three nitrogens and is selected from the group consisting of (1) 1,2,4-triazole, (2) 4-amino- 1,2,4-triazole, (3) benzotriazole, (4) 1H-benzotriazole carboxaldehyde, (5) benzotriazole-5-carboxylic acid, (6) 1-(methoxymethyl)-1H-benzotriazole, (7) 5-methyl-1H-benzotriazole, (8) N-(triphenyl phosphoranylidene)-1H-benzotriazole-1-methane amine, (9) 1-amino benzotriazole, and (10) [1-(4-morpholinyl) propyl] benzotriazole; an ink composition wherein the azole compound is selected from the group consisting of 1,2,4-triazole, 4-amino-1,2,4-triazole, and benzotriazole; an ink composition wherein the azole compound contains four nitrogens and is selected from the group consisting of (1) 5-mercapto-1-methyltetrazole, and (2) 1,5-pentamethylene tetrazole; an ink composition wherein the viscosity compound is a cyclic compound containing one nitrogen and is selected from the group consisting of (1) 2-acetyl pyrrole, (2) 1-(2-aminophenyl) pyrrole, (3) ethyl 3,4-diethyl-5-methyl-2-pyrrole carboxylate, (4) 1-(phenylsulfonyl)pyrrole, (5) methyl 5-(benzyloxycarbonyl)-2,4-dimethyl-3-pyrrole propionate, (6) 5-bromoindole, (7) methylindole, (8) 3-(2-bromoethyl) indole, (9) 5-chloro-2-methylindole, (10) [3-(dimethylamino methyl) indole], (11) indolyl acetate, (12) 5-methoxy-2-methyl indole, and (13) 1-(phenylsulfonyl) indole; an ink composition wherein the viscosity compound is selected from the group consisting of 2-acetyl pyrrole; methyl indole, and 1-(phenylsulfonyl)pyrrole; an ink composition wherein the viscosity compound is an imidazoline selected from the group consisting of (1) 2-methyl-2-imidazoline, (2) 2-benzyl-2-imidazoline, (3) 2-phenyl-2-imidazoline, (4) 1-ethyl-2-benzimidazolinone, (5) 1,3-diacetyl-2 -imidazolidinone, and (6) 1-(ρ-tosyl)-3,4,4-trimethyl imidazolidin; an ink composition wherein the viscosity compound is a thiazole compound selected from the group consisting of (1) 2-aminothiazole, (2) 2-amino-5-methylthiazole, (3) ethyl 2-amino-4-thiazole acetate, (4) ethyl 2-(formylamino)-4-thiazole acetate, (5) 2-amino-4-phenyl-5-tetradecylthiazole, (6) S-2-benzothiazolyl 2-amino-α-(methoxyimino)-4-thiazolethioacetate, (7) 1-amino benzothiazole, and (8) 2-(methylsulfonyl) benzothiazole; an ink wherein the lightfastness component is selected from the group consisting of (1) 4'-(imidazol-1-yl) acetophenone, (2) 2-(2H-benzotriazol-2-yl)-4,6-di-tert-pentylphenol, (3) 2-(2H-benzotriazol-2-yl)-4-(1,1,3,3-tetramethyl butyl) phenol, and (4) 2-[3-(2H-benzotriazol-2-yl)-4-hydroxyphenyl]ethyl methacrylate; an ink wherein the antioxidant compound is a lightfastness compound selected from the group consisting of (1) antimony dialkyl phosphorodithioate, (2) molybdenum oxysulfide dithiocarbamate, (3) nickel-bis(o-ethyl(3,5-di-tert-butyl-4-hydroxybenzyl) phosphonate, and (4) tetrasodium N-(1,2-dicarboxyethyl)-N-octadecyl sulfosuccinamate; an ink wherein the colorant is selected in an amount of from about 0.5 to about 20 percent by weight; an ink wherein the colorant is a pigment, or a dye; an ink wherein the colorant is a pigment of carbon black; an ink wherein the colorant is a pigment of cyan, magenta, yellow, black, blue, green, brown, or mixtures thereof; an ink composition wherein the azole compound contains two hetero atoms, and which compound possesses a melting point of from about 60 to about 135° C., and is present in an amount of from about 30 to about 90 percent by weight, and is selected from the group consisting of pyrazole; 2-undecyl imidazole; 1,1'-carbonyl diimidazole; and 1,2,4-triazole; the viscosity compound possesses a melting point of from about 55° C. to about 130° C., is present in an amount of from about 59 to about 1 percent by weight, and is selected from the group consisting of 2-acetyl pyrrole, 3-methyl indole, 1-(phenylsulfonyl) pyrrole; 2-methyl-2-imidazoline, and 2-amino-4-phenyl-5-tetradecylthiazole; the lightfastness component is present in an amount of from about 10 to about 0.25 percent by weight and is selected from the group consisting of 2-(2H-benzotriazol-2-yl)-4-(1,1,3,3-tetramethyl butyl)phenol; and 2-[3-(2H-benzotriazol-2-yl)-4-hydroxyphenyl]ethyl methacrylate; the antioxidant is present in an amount of from about 10 to about 0.25 percent by weight and is selected from the group consisting of tetra-sodium-N-(1,2-dicarboxyethyl)-N-octadecyl-sulfosuccinamate); and molybdenum oxysulfide dithio carbamate; and the colorant is present in an amount of from about 20 to about 0.5 percent by weight and wherein the total amount of the ink components is about 100 percent; an ink with a viscosity of from about 1 centipoise to about 10 centipoise, crease values of from about 3 to about 10, haze values of from about 7 to about 12, gloss values of from about 80 to about 90, conductivity values of from about 7 to about 8 [log (pico.mho/cm), and which ink possesses an acoustic-loss value of from about 10 to about 80 dB/mm; an ink with a viscosity of from about 1 centipoise to about 10 centipoise, crease values of from about 3 to about 8, haze values of from about 6 to about 12, gloss values of from about 85 to about 90, conductivity values of from about 7.5 to about 9 [log (pico.mho/cm), and which ink possesses an acoustic-loss value of from about 10 to about 80 dB/mm; a printing process which comprises incorporating into an acoustic ink jet printer the ink as indicated hereinbefore, and causing droplets of the ink to be ejected in imagewise pattern onto a substrate; a printing process which comprises (a) providing an acoustic ink printer having a pool of the liquid ink as indicated hereinbefore with a free surface, and a printhead including at least one droplet ejector for radiating the free surface of the ink with focused acoustic radiation to eject individual droplets of ink therefrom on demand, the radiation being brought to focus with a finite waist diameter in a focal plane, and causing droplets of the ink to be ejected in imagewise pattern onto a substrate; a process and wherein the ink possesses an acoustic-loss value of from about 10 to about 80 dB/mm, and which ink possesses a viscosity of from about 1 centipoise to about 10 centipoise at a temperature of from about 125° C. to about 165° C.; an ink composition comprised of (1) an azole compound; (2) a lightfastness component; (3) an antioxidant; and (5) a colorant; an ink wherein the ink further contains a viscosity modifying compound, and which compound primarily functions to alter the viscosity of the ink; an ink which ink is nonaqueous and which ink is conductive, and wherein the azole compound optionally contains from about 2 to about 4 nitrogen atoms in a ring structure; an ink composition wherein (1) the azole compound possesses a melting point of from about 70 to about 135° C., and possesses an acoustic-loss value of from about 25 to about 80 dB/mm, (2) the viscosity modifying compound possesses an acoustic-loss value of from about 15 to about 60 dB/mm, and which ink yields images with crease values of from about 3 to about 8, haze values of about 10 to about 20, gloss values of about 85 to about 95, conductivity values of about 70 to about 9 [log(pico.mho/cm), and which ink possesses an acoustic-loss value of from about 10 to about 80 dB/mm, and which ink possesses a viscosity of from about 1 centipoise to about 20 centipoise at a temperature of from about 125° C. to about 165° C.; a conductive nonaqueous ink composition wherein the azole compound possesses a melting point of from about 60° C. to about 130° C., is present in an amount of from about 30 to about 90 percent by weight and is selected from pyrazole; 2-undecyl imidazole; and 1,1'-carbonyl diimidazole; 1,2,4-triazole; the viscosity compound possesses a melting point of about 55° C. to about 125° C., is present in an amount of from about 59 to about 1 percent by weight and is selected from the group consisting of 2-acetyl pyrrole, 3-methyl indole; 1-(phenylsulfonyl) pyrrole; 2-methyl-2-imidazoline; and 2-amino-4-phenyl-5-tetradecylthiazole; the lightfastness component is a UV absorber present in an amount of from about 10 to about 0.25 percent by weight and is selected from the group consisting of 2-(2H-benzotriazol-2-yl)-4-(1,1,3,3-tetramethyl butyl) phenol; and 2-[3-(2H-benzotriazol-2-yl)-4-hydroxyphenyl] ethyl methacrylate; the antioxidant is present in an amount of from about 10 to about 0.25 percent by weight and is selected from the group consisting of tetra-sodium-N-(1,2-dicarboxyethyl)-N-octadecyl-sulfosuccinamate); and molybdenum oxysulfide dithio carbamate, and the colorant is present in an amount of from about 0.5 to about 20 percent by weight; an ink wherein the azole is pyrazole; iodo pyrazole; 1,1'-(1-ethylpropylidene)bis-1-H-pyrazole; 2-undecyl imidazole; 1,1'-carbonyl diimidazole; 1,1'-sulfonyl diimidazole; or 1,1'-thiocarbonyl diimidazole; an ink wherein the viscosity compound is 2-acetyl pyrrole; methyl indole; or 1-(phenylsulfonyl)pyrrole; an ink which is conductive and wherein the azole is an imidazole containing a ring structure with from about 2 to about 4 nitrogen atoms in the ring; a process for the preparation of the ink as indicated hereinbefore which comprises the mixing of (1), (2), (3), (4) and (5); a conductive nonaqueous phase-change acoustic ink compositions comprised of (1) a phase-change azole compound such as a pyrazole, an imidazole, a triazole, or a tetrazole compound, having a melting point of between about 60° C. to about 135° C., and preferably from about 60° C. to about 100° C., and with a low acoustic loss value of between about 25 to about 80 dB/mm, (2) a viscosity modifying compound that functions to reduce the ink viscosity and which compound can be selected from derivatives of pyrrole, indole, imidazoline and thiazole, each with, for example, a boiling point of from about 150° C. to about 225° C., and a melting point of about 25° C. to about 130° C., and preferably about 60° C. to about 100° C., and each with an acoustic loss of about 15 to about 60 dB/mm, (3) a lightfastness UV absorber, (4) a lightfastness antioxidant, (5) and a colorant.

The solid azole vehicle compound, preferably about 2 to about 4 nitrogen atoms in the ring such as pyrazole, imidazole, triazole and tetrazole with, for example, a melting point of from about 60° C. to about 135° C. and preferably from about 60° C. to about 100° C., and which compound is present, for example, in an amount of from about 1 to about 98 percent by weight. The viscosity modifying compound possesses an acoustic-loss value of from about 15 to about 60 dB/mm and is present in the ink composition in an amount of, for example, from about 59 to about 1 percent by weight; the lightfastness UV absorber is present, for example, in an amount of from about 10 to about 0.25 percent by weight, the antioxidant is, for example, present in an amount of from about 10 to about 0.25 percent by weight, and the colorant is, for example, present in an amount of from about 20 to about 0.5 percent by weight.

The ink composition contains, for example, the following range amounts for components (1), (2), (3), (4) and (5) [1+59+10+10+20=100] to [98+1+0.25+0.25+0.5=100].

In embodiments the azole compound with a preferred acoustic-loss value of from about 25 to about 80 dB/mm and a preferred melting point of about 60° C. to about 135° C. is present in, for example, an amount of from about 30 to about 90 percent by weight, the viscosity modifying compound having a melting point of between about 55 to about 130° C. is present in an amount of from about 50 to about 7 percent by weight, the UV absorber is present in an amount of from about 5 to about 1 percent by weight, the antioxidant is present in an amount of from about 5 to about 1 percent by weight, and the colorant is present in an amount of from about 10 to about 1 percent by weight. The ink composition contains the following preferred range amounts [30+50+5+5+10=100] to [90+7+1+1+1=100].

These composition ranges, and the others that may be indicated herein were established using a number of known techniques, such as a statistical design based on the analyses of the experimental data of viscosity at 150° C., jettability at 150° C., image quality [high optical density, low crease, high gloss], lightfast, and waterfast values of images generated with various ink compositions.

The inks of the present invention yield, for example, images that are durable [crease less than about 60] and withstand the pressures of paper-folding such that there is no loss of information. The procedure followed to measure crease on images printed with the inks of the present invention is the same as used in the evaluation of xerographic images. The average width of the creased image due to pressure was obtained on colored and black solid area images printed on paper by (a) folding inwards the printed area of the image, (b) passing on the folded image a standard TEFLON coated copper roll 2 inches in width, 3 inches in outer diameter, 2.25 inches in inner diameter and weighing 860 grams, (c) unfolding the paper and wiping the loose toner or ink from the creased imaged surface with a cotton swab, (d) measuring the average width of the ink free creased area with an image analyzer.

Examples of solid additives present, for example, in an amount of from about 1 to about 98 percent by weight, and preferably in an amount of from about 30 to about 90 percent by weight, include:

(a) pyrazole compounds, such as (1) pyrazole (Aldrich #P5,660-7); (2) 1-nitro pyrazole, (Aldrich #39,074-7); (3) 4-iodo pyrazole (Aldrich #21,399-3); (4) 4-bromo pyrazole (Aldrich #37,482-2); (5) 3,5-dimethyl pyrazole (Aldrich #D18,200-1); (6) 4-bromo-3-methylpyrazole (Aldrich #27,823-8); (7) 4-bromo-3,5-dimethyl pyrazole (Aldrich #B6,440-7); (8) 3-amino-5-phenyl pyrazole (Aldrich #39,379-7); (9) ethyl 4-pyrazolecarboxylate (Aldrich #30,078-0); (10) 1,1'-cyclopentylidene bis-1-H-pyrazole (Aldrich #39,415-7); (11) α-[(2-ethoxy-2-oxoethoxy)imino]-3-pyrazoleacetic acid (Aldrich #38,971-4); (12) ethyl 5-amino-1-phenyl-4-pyrazole carboxylate (Aldrich #37,944-1); (13) 1,1'-(1-ethylpropylidene)bis-1-H-pyrazole (Aldrich #39,414-9); (14) ethyl 3-amino-4-pyrazolecarboxylate, (Aldrich#A4,500-9); (15) 3,5-bis (trifluoromethyl) pyrazole (Aldrich #39,039-9); (16) N-(tert-butoxycarbonyl)-1H-pyrazole-1-carbox amidine (Aldrich #44,201-1); (17)3,5-dimethylpyrazole-1-carboxamide (Aldrich #D18,220-6); (18) 3,5-dimethylpyrazole-1-methanol (Aldrich #33,145-7; (19) 2,3-dimethyl-1-phenyl-3-pyrazolin-5-one, (Aldrich #A9,135-3);

(b) imidazole compounds such as (1) imidazole (Aldrich #43,615-1); (2) 4-methyl imidazole (Aldrich # 19,988-5); (3) 2-ethyl imidazole (Aldrich # 23,934-8); (4) 2-ethyl-4-methylimidazole (Aldrich #E3,665-2); (5) 2-propyl imidazole (Aldrich #37,537-3); (6) 2-isopropyl imidazole, (Aldrich #37,399-0); (7) 1-acetylimidazole (Aldrich #15,786-41); (8) 1-benzylimidazole (Aldrich #11,641-6); (9) 2-undecyl imidazole (Aldrich #40,948-0); (10) 1,5-dicyclohexyl imidazole (Aldrich #31,654-7); (11) 1-(2,4,6-triisopropyl benzene sulfonyl imidazole (Aldrich #40,948-0); (12) 1-(mesitylene sulfonyl) imidazole (Aldrich #24,422-8); (13) 1-trans-cinnamoyl imidazole (Aldrich #21,904-5); (14) 2-methyl-4-nitro-1-imidazole propionitrile (15) 1,1'-carbonyl diimidazole (Aldrich #11,553-3); (16) 1,1'-thiocarbonyl diimidazole, (Aldrich #15,605-1); (17) 1,1'-sulfonyl diimidazole (Aldrich #36,781-8); (18) 1,1'-oxalyldiimidazole (Aldrich #36,643-9); (Aldrich #37,769-4); (19) 5-methyl benzimidazole (Aldrich #30,523-5);

(c) triazole derivatives such as (1) 1,2,4-triazole, (Aldrich #T4,610-8); (2) 4-amino-1,2,4-triazole (Aldrich #A8,180-3); (3) benzotriazole (Aldrich #B1,140-0); (4) 1H-benzotriazole carboxaldehyde, (Aldrich #44,691-2); (5) benzotriazole-5-carboxylic acid, (Aldrich #30,423-9); (6) 1-(methoxy methyl)-1H-benzotriazole, (Aldrich #43,802-0); (7) 5-methyl-1H-benzotriazole, (Aldrich #19,630-4); (8) N-(triphenylphosphoranylidene)-1H-benzotriazole-1-methane amine, (Aldrich #44,693-9); (9) 1-aminobenzotriazole (Aldrich #38,637-5); (10) 1-cyanobenzotriazole (Aldrich #38,181-0); (11) (4-morpholinyl methyl) benzotriazole (Aldrich #46,750-2); (12) (4-morpholinyl phenylmethyl) benzotriazole (Aldrich #46,926-2); (13) [1-(4-morpholinyl) propyl] benzotriazole (Aldrich # 47,108-9); and (d) those with four nitrogens in the cyclic ring such as (1) 5-mercapto-1-methyltetrazole (Aldrich #35,787-1); (2) 1,5-pentamethylene tetrazole (Aldrich #P,720-7).

Viscosity compound examples, for example, in an amount of from about 59 to about 1 percent by weight, and preferably from about 50 to about 7 percent by weight, include:

(a) compounds containing one nitrogen in the cyclic ring such as (1) 2-acetyl pyrrole (Aldrich #24,735-9); (2) 1-(2-aminophenyl)pyrrole (Aldrich #19,694-0); (3) 1-(phenylsulfonyl)pyrrole (Aldrich #43,883-9); (4) acetyl-1-(phenylsulfonyl)pyrrole (Aldrich #43,881-2) (Aldrich #43,882-0); (5) methyl 5-(benzyloxycarbonyl)-2,4-dimethyl-3-pyrrole propionate (Aldrich #28,895-0); (6) ethyl 3,4-diethyl-5-methyl-2-pyrrole carboxylate (Aldrich #33,715-3); (7) 5-bromoindole (Aldrich #B6,860-7); (8) methylindole (Aldrich #M5,149-0), (Aldrich #M5,145-8); (9) 3-(2-bromoethyl)indole (Aldrich #37,652-3); (10) 5-chloro-2-methylindole (Aldrich #C5,280-2); (11) [3-(dimethylamino methyl) indole]; (12) indolyl acetate (Aldrich #44,691-2); (Aldrich #25,904-7); (13) 5-methoxy-2-methyl indole (Aldrich # M1,545-1); or (14) 1-(phenylsulfonyl)indole,(Aldrich #36,663-3);

(b) compounds containing two nitrogens in the cyclic ring such as imidazoline derivatives such as (1) 2-methyl-2-imidazoline (Aldrich #37,540-3); (2) 2-benzyl-2-imidazoline (Aldrich #29,349-0); (3) 2-phenyl-2-imidazoline (Aldrich #21,303-9); (4) 1-ethyl-2-benzimidazolinone, (Aldrich #19,401-8); (5) 1,3-diacetyl-2-imidazolidinone, (Aldrich #34,078-2), or (6) 1-(ρ-tosyl)-3,4,4-trimethylimidazolidine (Aldrich #31,758-6); and (c) derivatives containing a nitrogen and a sulfur atom in the ring such as thiazole compounds such as (1) 2-aminothiazole (Aldrich #12,312-9); (2) 2-amino-5-methylthiazole (Aldrich #38,056-3); (3) ethyl 2-amino-4-thiazole acetate (Aldrich #22,055-8); (4) ethyl 2-(formylamino)-4-thiazole acetate (Aldrich #27,975-7); (5) 2-amino-4-phenyl-5-tetradecylthiazole (Aldrich #14,105-4); (6) S-2-benzothiazolyl 2-amino-α-(methoxyimino)-4-thiazole thioacetate (Aldrich #36,085-6); (7) 1-aminobenzothiazole (Aldrich #10,881-2); or (8) 2-(methylsulfonyl) benzothiazole (Aldrich # 45,435-4).

Examples of lightfastness components to primarily protect developed images from UV degradation and present in the ink composition in an amount of from about 10 to about 0.25 percent by weight, and preferably in an amount of from about 5 to about 1 percent by weight, include (1) 4'-(imidazol-1-yl) acetophenone (Aldrich #18,373-3); (2) 2-(2H-benzotriazol-2-yl)-4,6-di-tert-pentylphenol (Aldrich #42,274-6); (3) 2-(2H-benzotriazol-2-yl)-4-(1,1,3,3-tetramethylbutyl)phenol (Aldrich #32,280-6); or (4) 2-[3-(2H-benzotriazol-2-yl)-4-hydroxyphenyl]ethyl methacrylate (Aldrich # 41,343-7).

Lightfast antioxidant examples that primarily protect these ink developed images from oxidation and are present in the ink composition in an amount of from about 10 to about 0.25 percent by weight, and preferably in an amount of from about 5 to about 1 percent by weight include (1) antimony dialkyl phosphorodithioate, (2) molybdenum oxysulfide dithio carbamate, both available from Vanderbilt Corporation, (3) (nickel-bis(o-ethyl(3,5-di-tert-butyl-4-hydroxybenzyl) phosphonate, Ciba Geigy Corporation, or (4) tetra sodium-N-(1,2-dicarboxyethyl)-N-octadecyl sulfosuccinamate, American Cyanamid Corporation.

Suitable colorants present in an effective amount generally of from about 20 to about 0.5 percent by weight, and preferably from about 10 to about 1 percent by weight, include pigments and dyes, with solvent dyes being preferred. Colorants include pigments, dyes, mixtures thereof, mixtures of dyes, mixtures of pigments, and the like.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2GO1 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as REGAL 330® (Cabot), Carbon Black 5250, Carbon Black 5750 (Columbia Chemical Company).

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling compounds of the present application. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-20 GNH (Hodogaya Chemical Company), Sirius Supra Yellow GD 167, Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT (Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like, with Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF) being preferred.

The inks of the present invention can be prepared by any suitable method, for example a colored phase-change ink composition can be prepared by mixing 70 percent by weight of the conductive imidazole compound such as 2-undecyl imidazole [conductivity=8.0 expressed in log (picomho/cm)] having an acoustic-loss value of less than about 60 dB/mm less than about 40 dB/mm and a melting point of point of between about 60° C. to about 120° C.; 15 percent by weight of the viscosity improving compound such as 2-acetyl pyrrole, having an acoustic-loss value of 20 dB/mm and a melting point of about 85° C.; 5 percent by weight of a lighfast UV absorber, 5 percent by weight of lightfast antioxidant and 5 percent by weight of a colorant. The mixture was heated to a temperature of about 120° C. to about 130° C. and stirred for a period of about 60 minutes until it formed a homogeneous solution, and subsequently was cooled to 25° C. This ink had a viscosity of 5.5 centipoise and conductivity of 8.0 [log(pico.mho./cm)] at 150° C.

The inks of the present invention are suitable for printing processes wherein the substrate, such as paper, transparency material, or the like is heated during the printing process to facilitate formation of the liquid crystalline phase within the ink. When transparency substrates are employed, temperatures typically are limited to a maximum of about 100° C. to about 110° C., since the polyester typically employed, as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, U.S. Pat. No. 4,745,419 entitled and *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

The size of the ejection orifice is a design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes are disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss measurements recited herein were measured as follows: samples of various liquid vehicles and solid paper surface leveling compounds were placed between the two transducers, with the temperature set at 150° C. The samples were let to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances.

The pyrazole, imidazole, thiazole triazole, tetrazole compounds are preferably crystalline or semicrystalline in the solid state. When solidified on a substrate such as paper or a transparency they crystallize in spherulitic [spherical crystals] morphology. It can be important to control the size of the spherulites to be about 0.1 to about 10 microns, preferably about 1 to about 4 microns, to enable, for example, optimum projection efficiency. The image opacity also increases with the size of the spherulites. The spherulite size can be measured by an optical microscope with cross-polarized light or by the low angle solid state light scattering method (R. S. Stein and M. B. Rhodes, *J. Appl. Phys.*, 31, 1873 (1960)). The latter provides an average size from the sample. A monochromatic, vertically polarized light is passed through the sample. The scattered light is analyzed with another nicol prism, with its optic axis horizontal. This is conventionally known as the $H_v$ scattering method. The spherulite size is measured from the location of the maximum intensity in the four-leaf clover scattering pattern. The small spherulite size is also important for acceptable to excellent crease resistance. Large spherulites, of a size greater than about 5 microns, could lead to brittle prints. With the present invention in embodiments, the pyrazole, imidazole, thiazole triazole, tetrazole, pyrrole, indole, and imidazoline compounds form a dispersed phase of small from about 1 to about 2.5 micrometers spherulitic crystalline domains in the matrix of each other. This morphology not only improves the projection efficiency, but also increases the crease resistance.

The optical density values of Black [Neozapon Black X51 C.I. #12195] between 2.1 to 2.3, Cyan [Sudan Blue 670 C.I. #61554] between 1.80 to 1.85, Magenta Sudan Red 462 [C.I. #26050], between 1.90 to 1.95, and Yellow [Sudan Yellow 146 C.I. #12700] between 1.37 to 1.45, recited herein were obtained on a Pacific Spectrograph Color System. The system consists of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information; the lightfast values of ink jet images were measured in the Mark V Lightfast Tester obtained from Microscal Company, London, England; the waterfast values of the ink jet images were obtained from the optical density data recorded before and after washing with water at 25° C. for five minutes; the viscosity values recited herein were measured at 150° C. with a Stress Rheometer from Cari-Med model CSL 100, and at a shear rate of 1,250 s$^{-1}$; the conductivity values expressed as log(picomho/cm) and recited herein were measured under melt conditions at 150° C. by placing an aluminum electrode in the melt and reading the resistivity output on a GenRad 1689 precision RLC Digibridge at a frequency of 1 K.Hz. Conductivity is calculated from the resistivity data; the average width of the creased image due to pressure was obtained on colored and black solid area images printed on paper by (a) folding inwards the printed area of the image, (b) passing on the folded image a standard TEFLON coated copper roll 2 inches in width, 3 inches in outer diameter, 2.25 inches in inner diameter and weighing 860 grams, (c) unfolding the paper and wiping the loose toner from the creased imaged surface with a cotton swab, (d) measuring the average width of the toner free creased area with an image analyzer; and the haze values of images usually between about 10 to about 30 and preferably between about 10 to about 20 were measured on images printed on uncoated polyester such as MYLAR® with a Haze meter XL-211, HAZEGARD® System obtained from Pacific Scientific Company.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A black phase-change ink composition was prepared by mixing 70 percent by weight of the solid conductive compound pyrazole, (Aldrich #P5,660-7) with a melting point of 70° C., an acoustic-loss value of 29 dB/mm and conductivity of 7.7 log(pico.mho/cm)]; 15 percent by weight of the viscosity modifying compound 2-acetyl pyrrole, (Aldrich #24,735-9), having an acoustic-loss value of 20 dB/mm and a melting point of 85° C.; 5 percent by weight of the UV absorber 2-(2H-benzotriazol-2-yl)-4,6-di-tert-pentyl phenol, (Aldrich #42,274-6); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Neozapon Black X51 [C.I. Solvent Black; C.I. #12195] (BASF). The resulting mixture was heated to a temperature of about 120° C. and stirred for a period of about 60 minutes until it formed a homogeneous solution, and subsequently the solution was cooled to 25° C. The resulting black ink had an acoustic loss value of 40 dB/mm, a viscosity of 5.65 cps and a conductivity of 7.5 [log(pico.mho/cm)] at 150° C.

EXAMPLE II

A blue phase-change ink composition was prepared by mixing 70 percent by weight of the conductive compound 1,1'-(1-ethylpropylidene) bis-1-H-pyrazole, (Aldrich #39,414-9) having a melting point of 63° C., an acoustic-loss value of 34 dB/mm, and a conductivity of 7.5 [log(pico.mho/cm)]; 15 percent by weight of the viscosity modifying compound 5-mercapto-1-methyltetrazole, (Aldrich #35,787-1), having a s melting point of 126° C., and an acoustic-loss value of 31 dB/mm; 5 percent by weight of the UV absorber 2-(2H-benzotriazol-2-yl)-4-(1,1,3,3-tetramethylbutyl) phenol, (Aldrich #32,280-6); 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Blue 670 [C.I. #61554] (BASF). The mixture was heated to a temperature of about 130° C. and stirred for a period of about 60 minutes until it formed a homogeneous solution, and subsequently the solution was cooled to 25° C. The resulting blue ink had an acoustic loss value of 37 dB/mm, a viscosity of 5.72 cps and conductivity of 7.5 [log(pico.mho/cm)] at 150° C.

EXAMPLE III

A yellow phase-change ink composition was prepared by mixing 70 percent by weight of the conductive compound 2-undecyl imidazole, (Aldrich #40,948-0), having a melting point of 73° C., an acoustic-loss value of 33 dB/mm and conductivity of 8.0 [log(pico.mho/cm)]; 15 percent by weight of the viscosity modifying compound 2-phenyl-2-imidazoline, having a melting point of 97° C. and an acoustic-loss value of 34 dB/mm; 5 percent by weight of the UV absorber 2-[3-(2H-benzotriazol-2-yl)-4-hydroxyphenyl] ethyl methacrylate (Aldrich #41,343-7); 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Yellow 146 [C.I. #12700] (BASF). The mixture was heated to a temperature of about 100° C. and stirred for a period of about 60 minutes until it formed a homogeneous solution, and subsequently the solution was cooled to 25° C. The resulting yellow ink had an acoustic loss value of 38 dB/mm, a viscosity of 5.5 cps and a conductivity of 7.5 [log(pico.mho/cm)] at 150° C.

EXAMPLE IV

A red phase-change ink composition was prepared by mixing 70 percent by weight of the conductive compound 2-ethyl imidazole (Aldrich #23,934-8), having a melting point of 86° C., an acoustic-loss value of 34 dB/mm and a conductivity of 7.7 [log(pico.mho/cm)]; 15 percent by weight of the viscosity modifying compound 2-methyl-2-imidazoline, (Aldrich #37,540-3), having a melting point of 87° C.; 5 percent by weight of the UV absorber) 4'-(imidazol-1-yl) acetophenone, (Aldrich #18,373-3); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Red 462 [C.I. #26050] (BASF). The mixture was heated to a temperature of about 120° C. and stirred for a period of about 60 minutes until it formed a homogeneous solution, and subsequently the solution was cooled to 25° C. The resulting red ink had an acoustic loss value of 38 dB/mm and a viscosity of 5.8 cps and conductivity of 7.5 [log(pico.mho/cm)] at 150° C.

Each of the above four inks were incorporated into an acoustic ink jet printing test fixture utilizing the ejection mechanism disclosed in J. Appl. Phys. 65(9), 1 May 1989, and references therein, the disclosures of which are totally incorporated herein by reference. A jetting frequency of 160 MHz was used to generate drops of about 2 picoliters, up to 12 drops per pixel at 600 spi. The images formed on paper exhibited excellent color quality with optical density values of 2.40 (black), 1.95 (cyan), 2.1 (magenta), 1.5 (yellow), sharp edges, with lightfast values of black (97.5 percent), cyan (98.5 percent), magenta (97 percent), yellow (99 percent), waterfast values of black (96.5 percent), cyan (97. percent), magenta (98 percent), yellow (100 percent). The images obtained with these conductive inks on paper were folded and creased. The crease values were 3 for black, 8 for cyan, 7 for magenta and 5 for yellow. The ink spherulite radius was measured between 1 to 2.5 micrometer leading to haze values of between 10 to 15 when printed on transparencies.

EXAMPLE V

A black phase-change ink composition was prepared by mixing 70 percent by weight of the conductive compound imidazole (Aldrich #43,615-1), having an acoustic-loss value of 20 dB/mm, a melting point of 90° C. and a conductivity of 8.6 [log(pico.mho/cm)]; 15 percent by weight of the viscosity modifying compound 3-methyl indole (Aldrich #M5,145-8), having an acoustic-loss value of 30 dB/mm and a melting point of 95° C.; 5 percent by weight of the UV absorber 2-(2H-benzotriazol-2-yl)-4,6-di-tert-pentyl phenol (Aldrich #42,274-6); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Neozapon Black X51 [C.I. Solvent Black; C.I. #12195] (BASF). The mixture was heated to a temperature of about 120° C. and stirred for a period of about 60 minutes until it formed a homogeneous solution, and subsequently the solution was cooled to 25° C. The resulting black ink had an acoustic loss value of 37 dB/mm and a viscosity of 5.45 cps and conductivity of 7.5 [log(pico.mho/cm)] at 150° C.

EXAMPLE VI

A blue phase-change ink composition was prepared by mixing 70 percent by weight of the conductive compound 1,1'-thiocarbonyl diimidazole, (Aldrich #15,605-1); having a melting point of 102° C., an acoustic-loss value of 30 dB/mm and conductivity of 8.8 [log(pico.mho/cm)]; 15 percent by weight of the viscosity modifying compound 3-methyl indole (Aldrich #M5,145-8), having an acoustic-loss value of 30 dB/mm and a melting point of 95° C.; 5 percent by weight of the UV absorber 2-(2H-benzotriazol-2-yl)-4-(1,1,3,3-tetramethylbutyl)phenol (Aldrich #32,280-6); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Blue 670 [C.I. #61554] (BASF). The mixture was heated to a temperature of about 130° C. and stirred for a period of about 60 minutes until it formed a homogeneous solution, and subsequently was cooled to 25° C. This blue ink had an acoustic loss value of 39 dB/mm, a viscosity of 5.62 cps and a conductivity of 8.0 [log(pico.mho/cm)] at 150° C.

EXAMPLE VII

A yellow phase-change ink composition was prepared by mixing 70 percent by weight of the conductive compound 4-amino-1,2,4-triazole (Aldrich #A8,180-3); having a melting point of 85° C., an acoustic-loss value of 28 dB/mm and a conductivity of 8.3 [log(pico.mho/cm)]; 15 percent by weight of the viscosity modifying compound 2-amino-4-phenyl-5-tetradecylthiazole (Aldrich #14,105-4), having a melting point of 73° C. and an acoustic-loss value of 33 dB/mm; 5 percent by weight of the UV absorber 2-[3-(2H-benzotriazol-2-yl)-4-hydroxyphenyl]ethyl methacrylate (Aldrich #41,343-7); 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Yellow 146 [C.I. #12700](BASF). The mixture was heated to a temperature of about 130° C. and stirred for a period of about 60 minutes until it formed a homogeneous solution, and subsequently the solution was cooled to 25° C. This yellow ink had an acoustic loss value of 38 dB/mm, a viscosity of 5.6 cps and a conductivity of 7.8 [log(pico.mho./cm)] at 150° C.

EXAMPLE VIII

A red phase-change ink composition was prepared by mixing 70 percent by weight of conductive compound 1,5-pentamethylene tetrazole, (Aldrich #P,720-7) having a melting point of 61° C., an acoustic-loss value of 35 dB/mm, and a conductivity of 8.2 [log(pico.mho/cm)]; 15 percent by weight of the viscosity modifying compound 2-amino-4-phenyl-5-tetradecylthiazole (Aldrich #14,105-4), having a melting point of 73° C. and an acoustic-loss value of 33 dB/mm; 5 percent by weight of the UV absorber 4'-(imidazol-1-yl) acetophenone, (Aldrich #18,373-3); 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Red 462 [C.I. #26050] (BASF). The mixture was heated to a temperature of about 120° C. and stirred for a period of about 60 minutes until it formed a homogeneous solution, and subsequently the solution was cooled to 25° C. This red ink had an acoustic loss value of 38 dB/mm, a viscosity of 5.3 cps and a conductivity of 7.5 [log(pico.mho/cm)] at 150° C.

Each of the above four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed on paper exhibited excellent color quality with optical density values of 2.45 (black), 1.90 (cyan), 2.1 (magenta), 1.45 (yellow), sharp edges, with lightfast values of black (97.5 percent), cyan (99.5 percent), magenta (98 percent), yellow (99 percent), waterfast values of black (99 percent), cyan (98.5 percent), magenta (99 percent), yellow (100 percent). The images obtained with these conductive inks were creased and their crease values were 3 for black, 7 for cyan, 6 for magenta and 4 for yellow. The images formed on uncoated MYLAR™ exhibited excellent color quality with optical density values of 1.51 (black), 1.59 (cyan), 1.43 (magenta), 0.91 (yellow), sharp edges. The haze values of black, cyan, magenta and yellow ink images were measured at black (9), cyan (10), magenta (10), yellow (12). The gloss values of images were measured at about 90 for all the above inks. The ink spherulite radius was measured between 1 to about 2.5 micrometers leading to haze values of between 10 to 15 when printed on transparencies.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) an azole compound (2) a viscosity compound, (3) a lightfastness component, (4) an antioxidant, and (5) a colorant wherein said azole compound is selected from the group consisting of (1) pyrazole, (2) 1-nitropyrazole, (3) iodo pyrazole (4) 4-bromo pyrazole, (5) 4-bromo-3-methylpyrazole, (6) 4-bromo-3,5-dimethyl pyrazole, (7) 3-amino-5-phenyl pyrazole, (8) ethyl 4-pyrazolecarboxylate, (9) 1,1'-cyclopentylidenebis-1-H-pyrazole, (9) α-[(2-ethoxy-2-oxoethoxy) imino]-3-pyrazoleacetic acid, (10) ethyl 5-amino-1-phenyl-4-pyrazole carboxylate, (11) 1,1'-(1-ethylpropylidene)bis-1-H-pyrazole, (12) 3,5-dimethylpyrazole, (13) ethyl 3-amino-4-pyrazole carboxylate, and (14) 3,5-bis(trifluoromethyl)pyrazole.

2. An ink in accordance with claim 1 and wherein said azole is a solid and is conductive.

3. An ink in accordance with claim 1 and which ink contains substantially no water.

4. An ink in accordance with claim 1 and which ink contains no water or is water free.

5. An ink in accordance with claim 1 wherein (1) said azole compound has a melting point of from about 60 to about 135° C., and possesses an acoustic-loss value of from about 25 to about 80 dB/mm, and (2) said viscosity compound possesses an acoustic-loss value of from about 15 to about 60 dB/mm.

6. An ink in accordance with claim 1 and which ink yields images with crease values of from about 3 to about 8, haze values of from about 10 to about 15, gloss values of from about 80 to about 90, and which ink possesses a conductivity of from about 6 to about 8 [log(pico.mho/cm), and which ink optionally possesses an acoustic-loss value of from about 10 to about 80 dB/mm, and which ink optionally possesses a viscosity of from about 1 centipoise to about 10 centipoise at a temperature of from about 125° C. to about 165° C.

7. An ink in accordance with claim 1 wherein said ink possesses a conductivity of from about 6 to about 8.0 [log(pico.mho/cm).

8. An ink composition in accordance with claim 1 wherein the azole compound is present in an amount of from about 1 to about 98 percent by weight, the viscosity compound is present in an amount of from about 59 to about 1 percent by weight, the lightfastness component is present in an amount of from about 10 to about 0.25 percent by weight, the antioxidant is present in an amount of from about 10 to about 0.25 percent by weight, the colorant is present in an amount of from about 20 to about 0.5 percent by, and wherein the total of said ink compounds/components is about 100 percent.

9. An ink composition comprised of (1) an azole compound (2) a viscosity compound, (3) a lightfastness component, (4) an antioxidant, and (5) a colorant wherein said azole compound is selected from the group consisting of pyrazole, iodo pyrazole, and 1,1'-(1-ethylpropylidene)bis-1-H-pyrazole.

10. An ink composition comprised of (1) an azole compound (2) a viscosity compound, (3) a lightfastness component, (4) an antioxidant, and (5) a colorant, and wherein the azole compound is selected from the group consisting of 2-undecyl imidazole, 1,1'-carbonyl diimidazole, 1,1'-sulfonyl diimidazole, and 1,1'-thiocarbonyl diimidazole.

11. An ink composition comprised of (1) an azole compound (2) a viscosity compound, (3) a lightfastness component, (4) an antioxidant, and (5) a colorant, and wherein the azole compound contains three nitrogens and is selected from the group consisting of (1) 1,2,4-triazole, (2) 4-amino-1,2,4-triazole, (3) benzotriazole, (4) 1H-benzotriazolecarboxaldehyde, (5) benzotriazole-5-carboxylic acid, (6) 1-(methoxymethyl)-1H-benzotriazole, (7) 5-methyl-1H-benzotriazole, (8) N-(triphenyl phosphoranylidene)-1H-benzotriazole-1-methane amine, (9) 1-amino benzotriazole, and (10) [1-(4-morpholinyl) propyl] benzotriazole.

12. An ink composition comprised of (1) an azole compound (2) a viscosity compound, (3) a lightfastness component, (4) an antioxidant, and (5) a colorant, and wherein the azole compound is selected from the group consisting of 1,2,4-triazole, 4-amino-1,2,4-triazole, and benzotriazole.

13. An ink composition comprised of (1) an azole compound (2) a viscosity compound, (3) a lightfastness component, (4) an antioxidant, and (5) a colorant, and wherein the azole compound contains four nitrogens and is selected from the group consisting of (1) 5-mercapto-1-methyltetrazole, and (2) 1,5-pentamethylene tetrazole.

14. An ink composition in accordance with claim 1 wherein the viscosity compound is a cyclic compound containing one nitrogen and is selected from the group consisting of (1) 2-acetyl pyrrole, (2) 1-(2-aminophenyl) pyrrole, (3) ethyl 3,4-diethyl-5-methyl-2-pyrrole carboxylate, (4) 1-(phenylsulfonyl)pyrrole, (5) methyl 5-(benzyloxycarbonyl)-2,4-dimethyl-3-pyrrole propionate, (6) 5-bromoindole, (7) methylindole, (8) 3-(2-bromoethyl) indole, (9) 5-chloro-2-methylindole, (10) [3-(dimethylamino methyl) indole], (11) indolyl acetate, (12) 5-methoxy-2-methyl indole, and (13) 1-(phenylsulfonyl) indole.

15. An ink composition in accordance with claim 1 wherein the viscosity compound is selected from the group consisting of 2-acetyl pyrrole; methyl indole, and 1-(phenylsulfonyl)pyrrole.

16. An ink composition in accordance with claim 1 wherein the viscosity compound is an imidazoline selected from the group consisting of (1) 2-methyl-2-imidazoline, (2) 2-benzyl-2-imidazoline, (3) 2-phenyl-2-imidazoline, (4) 1-ethyl-2-benzimidazolinone, (5) 1,3-diacetyl-2-imidazolidinone, and (6)1-(ρ-tosyl)-3,4,4-trimethyl imidazolidine.

17. An ink composition in accordance with claim 1 wherein the viscosity compound is a thiazole compound selected from the group consisting of (1) 2-aminothiazole, (2) 2-amino-5-methylthiazole, (3) ethyl 2-amino-4-thiazole acetate, (4) ethyl 2-(formylamino)-4-thiazole acetate, (5) 2-amino-4-phenyl-5-tetradecylthiazole, (6) S-2-benzothiazolyl 2-amino-α-(methoxyimino)-4-thiazolethioacetate, (7) 1-amino benzothiazole, and (8) 2-(methylsulfonyl) benzothiazole.

18. An ink in accordance with claim 1 wherein the lightfastness component is selected from the group consisting of (1) 4'-(imidazol-1-yl) acetophenone, (2) 2-(2H-benzotriazol-2-yl)-4,6-di-tert-pentylphenol, (3) 2-(2H-benzotriazol-2-yl)-4-(1,1,3,3-tetramethyl butyl) phenol, and (4) 2-[3-(2H-benzotriazol-2-yl)-4-hydroxyphenyl]ethyl methacrylate.

19. An ink in accordance with claim 1 wherein the antioxidant compound is a lightfastness compound selected from the group consisting of (1) antimony dialkyl phosphorodithioate, (2) molybdenum oxysulfide dithiocarbamate, (3) nickel-bis(o-ethyl(3,5-di-tert-butyl-4-hydroxybenzyl) phosphonate, and (4) tetrasodium N-(1,2-dicarboxyethyl)-N-octadecyl sulfosuccinamate.

20. An ink in accordance with claim 1 wherein the colorant is selected in an amount of from about 0.5 to about 20 percent by weight.

21. An ink in accordance with claim 1 wherein the colorant is a pigment, or a dye.

22. An ink in accordance with claim 1 wherein the colorant is a pigment of carbon black.

23. An ink in accordance with claim 1 wherein the colorant is a pigment of cyan, magenta, yellow, black, blue, green, brown, or mixtures thereof.

24. An ink composition comprised of (1) an azole compound (2) a viscosity compound, (3) a lightfastness component, (4) an antioxidant, and (5) a colorant, and wherein the azole compound contains two hetero atoms, and which compound possesses a melting point of from about 60 to about 135° C., and is present in an amount of from about 30 to about 90 percent by weight, and is selected from the group consisting of pyrazole; 2-undecyl imidazole; 1,1'-carbonyl diimidazole; and 1,2,4-triazole; the viscosity compound possesses a melting point of from about 55° C. to about 130° C., is present in an amount of from about 59 to about 1 percent by weight, and is selected from the group consisting of 2-acetyl pyrrole, 3-methyl indole, 1-(phenylsulfonyl)pyrrole; 2-methyl-2-imidazoline, and 2-amino-4-phenyl-5-tetradecylthiazole; the lightfastness component is present in an amount of from about 10 to about 0.25 percent by weight and is selected from the group consisting of 2-(2H-benzotriazol-2-yl)-4-(1,1,3,3-tetramethyl butyl)phenol; and 2-[3-(2H-benzotriazol-2-yl)-4-hydroxyphenyl]ethyl methacrylate; the antioxidant is present in an amount of from about 10 to about 0.25 percent by weight and is selected from the group consisting of tetra-sodium-N-(1,2-dicarboxyethyl)-N-octadecyl-sulfosuccinamate); and molybdenum oxysulfide dithio carbamate; and the colorant is present in an amount of from about 20 to about 0.5 percent by weight and wherein the total amount of said ink components is about 100 percent.

25. An ink in accordance with claim 1 with a viscosity of from about 1 centipoise to about 10 centipoise, crease values of from about 3 to about 10, haze values of from about 7 to about 12, gloss values of from about 80 to about 90, conductivity values of from about 7 to about 8 [log (pico.mho/cm), and which ink possesses an acoustic-loss value of from about 10 to about 80 dB/mm.

26. An ink in accordance with claim 1 with a viscosity of from about 1 centipoise to about 10 centipoise, crease values of from about 3 to about 8, haze values of from about 6 to about 12, gloss values of from about 85 to about 90, conductivity values of from about 7.5 to about 9 [log (pico.mho/cm), and which ink possesses an acoustic-loss value of from about 10 to about 80 dB/mm.

27. A printing process which comprises incorporating into an acoustic ink jet printer the ink of claim 1, and causing droplets of the ink to be ejected in imagewise pattern onto a substrate.

28. A printing process which comprises (a) providing an acoustic ink printer having a pool of the liquid ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

29. A process in accordance with claim 28 and wherein said ink possesses an acoustic-loss value of from about 10 to about 80 dB/mm, and which ink possesses a viscosity of from about 1 centipoise to about 10 centipoise at a temperature of from about 125° C. to about 165° C.

30. An ink composition comprised of (1) an azole compound; (2) a lightfastness component; (3) an antioxidant; (5) a colorant, and (6) a viscosity compound, wherein the said viscosity compound is a cyclic compound containing one nitrogen and is selected form the group consisting of (1) 2-acetyl pyrrole, (2) 1-(2-aminophenyl) pyrrole, (3) ethyl 3,4-diethyl-5-methyl-2-pyrrole carboxylate, (4)1-(phenylsulfonyl) pyrrole, (5) methyl 5-(benzyloxycarbonyl)-2,4-dimethyl-3-pyrrole propionate, (6) 5-bromoindole, (7) methylindole, (8) 3-(2-bromoethyl) indole, (9) 5-chloro-2-methylindole, (10) [3-(dimethylamino methyl) indole, (11) indolyl acetate, (12) 5-methoxy-2-methyl indole, and (13) 1-(phenylsulfonyl) indole.

31. An ink in accordance with claim 30 wherein said viscosity compound primarily functions to alter the viscosity of said ink.

32. An ink composition in accordance with claim 1 wherein (1) said azole compound possesses a melting point of from about 70 to about 135° C., and possesses an acoustic-loss value of from about 25 to about 80 dB/mm, (2) said viscosity modifying compound possesses an acoustic-loss value of from about 15 to about 60 dB/mm, and which ink yields images with crease values of from about 3 to about 8, haze values of about 10 to about 20, gloss values of about 85 to about 95, conductivity values of about 70 to about 9 [log(pico.mho/cm), and which ink possesses an acoustic-loss value of from about 10 to about 80 dB/mm, and which ink possesses a viscosity of from about 1 centipoise to about 20 centipoise at a temperature of from about 125° C. to about 165° C.

33. An ink composition comprised of (1) an azole compound (2) a viscosity compound, (3) a lightfastness component, (4) an antioxidant, and (5) a colorant, and wherein the azole compound possesses a melting point of from about 60° C. to about 130° C., is present in an amount of from about 30 to about 90 percent by weight and is selected from pyrazole; 2-undecyl imidazole; and 1,1'-carbonyl diimidazole; 1,2,4-triazole; the viscosity compound possesses a melting point of about 55° C. to about 125° C., is present in an amount of from about 59 to about 1 percent by weight and is selected from the group consisting of 2-acetyl pyrrole, 3-methyl indole; 1-(phenylsulfonyl) pyrrole; 2-methyl-2-imidazoline; and 2-amino-4-phenyl-5-tetradecylthiazole; the lightfastness component is a UV absorber present in an amount of from about 10 to about 0.25 percent by weight and is selected from the group consisting of 2-(2H-benzotriazol-2-yl)-4-(1,1,3,3-tetramethyl butyl) phenol; and 2-[3-(2H-benzotriazol-2-yl)-4-hydroxyphenyl] ethyl methacrylate; the antioxidant is present in an amount of from about 10 to about 0.25 percent by weight and is selected from the group consisting of tetra-sodium-N-(1,2-dicarboxyethyl)-N-octadecyl-sulfosuccinamate); and molybdenum oxysulfide dithio carbamate, and the colorant is present in an amount of from about 0.5 to about 20 percent by weight.

34. An ink composition comprised of (1) an azole compound (2) a viscosity compound, (3) a lightfastness component, (4) an antioxidant, and (5) a colorant, and wherein said azole is pyrazole; iodo pyrazole; 1,1'-(1-ethylpropylidene)bis-1-H-pyrazole; 2-undecyl imidazole; 1,1'-carbonyl diimidazole; 1,1'-sulfonyl diimidazole; or 1,1'-thiocarbonyl diimidazole.

35. An ink in accordance with claim 1 wherein said viscosity compound is 2-acetyl pyrrole; methyl indole; or 1-(phenylsulfonyl)pyrrole.

36. A process for the preparation of the ink of claim 1 which comprises the mixing of (1), (2), (3), (4) and (5).

37. An ink in accordance with claim 1 wherein said viscosity compound is 2-actylpyrrole.

38. An ink in accordance with claim 1 wherein said viscosity modifying compound is 2-phenyl-2-imidazoline.

* * * * *